United States Patent Office 3,836,472

Patented Sept. 17, 1974

3,836,472

METHOD FOR PRODUCING MANGANESE-ZINC FERRITE

Shigeo Soejima, Nagoya, and Hideo Irokawa, Chiryu, Japan, assignors to NGK Insulators, Ltd., Nagoya, Japan No Drawing. Filed Dec. 4, 1972, Ser. No. 311,621

Claims priority, application Japan, Dec. 14, 1971, 46/100,626; Sept. 21, 1972, 47/94,116

Int. Cl. C04b *35/38, 35/40*

U.S. Cl. 252—62.57 3 Claims

ABSTRACT OF THE DISCLOSURE

Manganese-zinc ferrite for a magnetic head which has a high initial permeability and causes few ferrite noise and improves the resistance to the dropping out of ferrite crystallites generated by the rubbing of a magnetic tape, is produced by adding 0.001–0.06% by weight of at least one of alkali metal oxides selected from the group consisting of sodium oxide and potassium oxide, 0.005–0.04% by weight of rare earth metal oxides and 0.6–3.0% by weight of indium oxide to the starting materials of ferrite consisting mainly of ferric oxide, manganese oxide and zinc oxide, molding the resulting mixture, firing the molded body at a temperature of 1,100–1,300° C. under atmosphere of a reduced pressure of lower than $10^{-2}$ mm. Hg, firing the thus treated molded body at a temperature of 1,250–1,500° C. under a helium atmosphere containing 0.5–20% by volume of oxygen and cooling the sintered body.

BACKGROUND OF THE INVENTION

Field of the Invention

The present invention relates to a method for producing ferrite and particularly to a method for producing manganese-zinc ferrite having a high initial permeability in which the dropping out of ferrite crystallites caused by rubbing of a magnetic tape can be prevented when said manganese-zinc ferrite is used for a magnetic head.

Description of the Prior Art

Recently, the use of ferrites has been increased instead of the previous Permalloy and other metallic materials as a material for magnetic head, because ferrites have a high hardness and a high abrasion resistance against the rubbing of a magnetic tape and have excellent high frequency properties.

In general, the ferrite for a magnetic head needs that the initial permeability and the magnetic flux density are high and it is very important that the ferrite crystallites in the vicinity of the gap at the track surface are not dropped out due to the rubbing of the magnetic tape. Because if even a part of the ferrite crystallites of the magnetic head at the track surface is dropped out, the ferrite crystallites are dropped out successively and the recording or reproducing efficiency of the magnetic head is not only decreased but also the life is considerably reduced and further the magnetic tape is seriously damaged.

The previous method for producing the ferrite for magnetic head includes monocrystallizing process, hot press process and vacuum sintering process.

The ferrite produced by the monocrystallizing process is considerably influenced in the properties by the production factors and therefore it is difficult to maintain the quality constantly and further said ferrite thus produced has an orientation in the properties and accordingly it is necessary to cut the ferrite so as to agree accurately with this orientation and this process is very technically troublesome.

The hot press process is a very complicated process and is not suitable for the mass-production, because this process comprises inserting the shaped body into a mold, compressing the shaped body at a high temperature and taking out the ferrite from the state where the mold, powdery alumina of a compression medium and ferrite are tightly sticked.

Furthermore, Yuzo Shichijo et al. have proposed a vacuum sintering process ("Journal of Applied Physics" vol. 35, pages 1,646–1,647, 1964) wherein the primary firing stage is effected under an atmosphere of a reduced pressure and the succeeding firing stage is performed under nitrogen atmosphere containing a small amount of oxygen.

In this process, since the primary firing stage is effected under an atmosphere of a reduced pressure, the gas enclosed in the space among the particles of the shaped body, which retards elimination of pores in the sintering, is removed and further vacancies of oxygen are formed in a high concentration in the crystal structure of ferrite and mass transfer is made easy and the elimination of pores in the sintering is promoted. Furthermore, in order to obtain a high permeability, a secondary firing (succeeding firing stage) is performed under nitrogen atmosphere containing a small amount of oxygen to effect a moderate oxidation. However, since the atmosphere for the secondary firing is nitrogen containing a small amount of oxygen, nitrogen also enters into crystal grains as the oxidation proceeds but the diffusion constant of nitrogen is low, so that nitrogen remains in the interior of the sintered body and accumulates with the progress of sintering to form pores, which lower the density and permeability.

In addition, British Pat. No. 1,071,611 discloses a method for producing ferrite wherein the above described vacuum sintering process is adopted and further additives, such as $In_2O_3$, CaO and the like, are added to the starting materials of ferrite. But in this method it is difficult to make the pores remained in ferrite less than 0.5% and the remaining pores cause the dropping out of ferrite crystallites at the track surface owing to the rubbing of the magnetic tape.

The sintered ferrite produced by the above described vacuum sintering process is low in the strength of the grain boundary between the ferrite crystallites and therefore it is impossible in this process to prevent the dropping out of ferrite crystallites. In this process, it is considered to enlarge the crystallite size in order to decrease the dropping out of ferrite crystallites, but the specific noise of ferrite (ferrite noise) which is generated in the use of a magnetic head, is mainly based on a large size of ferrite crystallites and therefore the means for preventing the dropping out by enlarging the crystallite size is not adequate.

Ferrites obtained by conventional methods for producing sintered ferrite have micro-structures which are uneven in the crystallite size, so that they cause the dropping out and ferrite noise and are not suitable for ferrite for a magnetic head.

SUMMARY OF THE INVENTION

The object of the present invention is to provide a method for producing manganese-zinc ferrite for a magnetic head which can prevent the dropping out of ferrite crystallites generated by the rubbing of a magnetic tape and has an improved initial permeability and cause few ferrite noise.

The foregoing object and other objects as well as the characteristic features of the present invention will become more apparent and more readily understandable by the following description and the appended claims.

DETAILED DESCRIPTION OF THE PREFERRED EMBODIMENT

A preferred embodiment for producing the ferrite of the present invention will be explained in detail.

The method for producing the ferrite of the present invention comprises adding 0.001–0.06% by weight of at least one of alkali metal oxides selected from the group consisting of $Na_2O$ and $K_2O$, 0.005–0.04% by weight of at least one of rare earth metal oxides selected from the group consisting of $Y_2O_3$, $La_2O_3$, $CeO_2$, $Pr_2O_3$, $Nd_2O_3$ and $Sm_2O_3$ and 0.6–3.0% by weight of $Im_2O_3$ to the starting materials for manganese-zinc ferrite consisting mainly of 49–55 mol percent of $Fe_2O_3$, 35–15 mol percent of MnO and 30–10 mol percent of ZnO, preferably 50–53 mol percent of $Fe_2O_3$, 30–20 mol percent of MnO and 27–17 mol percent of ZnO, mixing the resulting materials in a steel ball mill by a wet process, calcining the mixture at a temperature of 800–1,100° C., crushing the calcined mixture in a steel ball mill by a wet process to obtain the calcined powder having a grain size of 1–2$\mu$, molding the thus obtained calcined powder added with a binder, such as distilled water by a conventional molding process, for example press molding or rubber press molding, firing the molded body in a firing furnace at a temperature of 1,100–1,300° C. for 1–20 hours under an atmosphere of a reduced pressure of lower than $10^{-2}$ mm. Hg and then firing the sintered body at a temperature of 1,250–1,500° C. for 2–8 hours under a helium atmosphere containing 0.5–20% by volume of oxygen and cooling the thus sintered body under an atmosphere containing a small amount of oxygen, such as a nitrogen atmosphere.

Furthermore, the above described alkali metal oxides, rare earth metal oxides and $In_2O_3$ may be used in the form of compounds which can be converted into these oxides through firing.

In the present invention, it has been found from a large number of experimental results that by the coexistence of the above described alkali metal oxide, rare earth metal oxide and $In_2O_3$ it is possible to make ferrite crystallites to uniform size of 20–40$\mu$ and further the bonding strength between ferrite crystallites can be increased. Moreover, by the primary firing under an atmosphere of a reduced pressure of less than $10^{-2}$ mm. Hg and the secondary firing under helium atmosphere containing 0.5–20% by volume of oxygen, a very compact ferrite having a porosity of less than 0.1% can be obtained. The co-effect of such auxiliary additive components and the firing conditions can only provide the ferrite which has a high initial permeability and has no hindrance of ferrite noise, and further does not cause the dropping out of ferrite crystallites due to the rubbing of a magnetic tape.

The reason why the amounts of the above described oxides are limited as mentioned above, will be explained hereinafter.

When the amount of the alkali metal oxides is less than 0.001% by weight, the distribution of the crystallite size becomes uneven.

When the amount of the rare earth metal oxides is less than 0.005% by weight, the bond between the ferrite crystallites is not satisfactorily improved and the prevention of the dropping out of ferrite crystallites cannot be attained.

When the amount of $In_2O_3$ is less than 0.6% by weight, the residual pores do not decrease to less than 0.1%.

On the other hand, when the amounts of the alkali metal oxide, the rare earth metal oxide and $In_2O_3$ exceed 0.06% by weight, 0.04% by weight and 3.0% by weight, respectively, the initial permeability is noticeably decreased.

The limitations of the primary firing temperature and the secondary firing temperature are based on the following reason. When the temperatures of the primary firing and the secondary firing are lower than 1,100° C. and 1,250° C., respectively, the residual pores cannot be decreased to less than 0.1%, while when the temperatures of the primary firing and the secondary firing are higher than 1,300° C. and 1,500° C., respectively, the volatilization of zinc is vigorous and the initial permeability is considerably decreased.

The limitations of the atmosphere of the primary firing and the secondary firing are based on the following reason.

When the pressure of the atmosphere of the primary firing exceeds $10^{-2}$ mm. Hg, it is impossible to decrease the residual porosity to less than 0.1%.

When the oxygen content in the helium atmosphere is less than 0.5% by volume or more than 20% by volume, the initial permeability is considerably decreased.

The following examples are given for the purpose of illustration of this invention and are not intended as limitations thereof.

Example 1

A main component composed of 51.5 mol percent of $Fe_2O_3$, 23.5 mol percent of MnO and 25.0 mol percent of ZnO was added with additives in the amounts as shown in the following Table 1.

The resulting mixture was mixed in a wet state for 20 hours in a steel ball mill, calcined at 950° C. for 2 hours, crushed in a steel ball mill for 20 hours and dried. After added with distilled water as a binder, the mass was molded under a press compression of 3.5 ton/cm.$^2$ to obtain a green compact. The green compact was fired at 1,150° C. for 6 hours under an atmosphere of a reduced pressure of $10^{-3}$ mm. Hg further fired at 1,420° C. for 2 hours under a helium atmosphere containing 12% by volume of oxygen, and cooled under a nitrogen atmosphere to obtain ferrite No. 1, No. 2, No. 3, No. 4 or No. 5.

As a control, the same main component as described above was added with 1.0% by weight of $In_2O_3$ as an additive, and the resulting mixture was mixed, calcined, crushed and molded under the same conditions as described above to obtain a green compact. The green compact was fired at 1,150° C. for 6 hours under an atmosphere of a reduced pressure of $10^{-3}$ mm. Hg, further fired at 1,420° C. for 2 hours under a nitrogen atmosphere containing 12% by volume of oxygen, and then cooled under a nitrogen atmosphere to obtain control ferrite No. 1.

Magnetic heads were prepared from the above obtained six ferrites. Properties of the ferrites and properties of the resulting magnetic heads are shown in Table 1.

TABLE 1

| Ferrite number | Additive (percent by weight) | | | | Time until reproducing output is decreased by 10% of the initial value (hr.) | Ferrite noise | Initial permeability | Magnetic flux density (gauss) | Curie temperature (° C.) | Porosity (percent) |
|---|---|---|---|---|---|---|---|---|---|---|
| | $Na_2O$ | $Y_2O_3$ | $In_2O_3$ | $Pr_2O_3$ | | | | | | |
| Present invention: | | | | | | | | | | |
| 1 | 0.003 | +0.01 | +1.0 | | Longer than 1,000 | Small | 15,400 | 3,480 | 90 | Less than 0.1. |
| 2 | 0.005 | +0.01 | +1.0 | | do | do | 16,000 | 3,480 | 90 | Do. |
| 3 | 0.01 | +0.01 | +1.0 | | do | do | 16,600 | 3,485 | 90 | Do. |
| 4 | 0.03 | +0.01 | +1.0 | +0.01 | do | do | 17,400 | 3,480 | 90 | Do. |
| | | | | $Nd_2O_3$ | | | | | | |
| 5 | 0.05 | +0.01 | +1.0 | +0.01 | do | do | 15,800 | 3,480 | 90 | Do. |
| Control, 1 | | | 1.0 | | 480 | Large | 14,500 | 3,480 | 90 | 0.5. |

The magnetic heads after running test were observed by a microscope. In the magnetic head prepared from control ferrite No. 1, large crystallites of about 200μ and small crystallites of about 20μ were irregularly distributed, and a large number of ferrite crystallites were dropped out near the gap due to rubbing of a magnetic tape, and the gap was broken and the reproducing output lowered. Furthermore, ferrite noise was large due to the presence of large crystallites near the gap.

While, in the magnetic head prepared from ferrites No. 1 to No. 5 of the present invention, ferrite crystallites had a uniform crystallite size of 20–40μ, no ferrite crystallites were dropped out, the reproducing output did not lower, and the life, which is represented by the time until the reproducing output is decreased by 10% of the initial value, was more than two times the life of conventional magnetic heads.

Example 2

A main component composed of 51.5 mol percent of $Fe_2O_3$, 23.5 mol percent of MnO and 25.0 mol percent of ZnO was added with additives in the amounts as shown in the following Table 2, and the resulting mixture was mixed, calcined, crushed and molded in the same manner as described in Example 1 to obtain a green compact.

The resulting green compact was fired at 1,280° C. for 2 hours under an atmosphere of a reduced pressure of $10^{-5}$ mm. Hg, further fired at 1,320° C. for 6 hours under a helium atmosphere containing 1.5% by volume of oxygen, and cooled under a nitrogen atmosphere to obtain ferrite No. 6, No. 7, No. 8 or No. 9.

As a control, the same main component as described above was added with 2.0% by weight of $In_2O_3$, and the resulting mixture was mixed, calcined, crushed and molded under the same conditions as described above to obtain a green compact. The green compact was fired at 1,280° C. for 2 hours under an atmosphere of a reduced pressure of $10^{-5}$ mm. Hg, further fired at 1,320° C. for 6 hours under a nitrogen atmosphere containing 1.5% by volume of oxygen, and cooled under a nitrogen atmosphere to obtain control ferrite No. 2.

Magnetic heads were prepared from the five ferrites obtained above. Properties of the ferrites and properties of the resulting magnetic heads are shown in Table 2.

TABLE 2

| Ferrite number | Additive (percent by weight) K₂O | La₂O₃ | In₂O₃ | Pr₂O₃ | Time until reproducing output is decreased by 10% of the initial value (hr.) | Ferrite noise | Initial permeability | Magnetic flux density (gauss) | Curie temperature (° C.) | Porosity (percent) |
|---|---|---|---|---|---|---|---|---|---|---|
| Present invention: | | | | | | | | | | |
| 6 | 0.003 | +0.015 | +2.0 | | Longer than 1,000 | Small | 15,800 | 3,480 | 90 | Less than 0.1. |
| 7 | 0.005 | +0.015 | +2.0 | | do | do | 16,200 | 3,475 | 90 | Do. |
| 8 | 0.01 | +0.015 | +2.0 | +0.015 | do | do | 16,200 | 3,475 | 90 | Do. |
| | | | | Sm₂O₃ | | | | | | |
| 9 | 0.02 | +0.015 | +2.0 | +0.015 | do | do | 15,900 | 3,480 | 90 | Do. |
| Control, 2 | | | 2.0 | | 240 | Large | 15,200 | 3,480 | 90 | 0.6. |

Microscopic observation of the magnetic heads after running test showed that in the magnetic head prepared from control ferrite No. 2, although the ferrite was composed of relatively fine crystallites of 10–20μ, a large amount of ferrite crystallites were dropped out near the gap, and the gap was broken, while in the magnetic head prepared from ferrites No. 6 to No. 9 of the present invention, no ferrite crystallites were dropped out, and the gap kept the initial state.

As seen from Table 2, the magnetic head prepared from the ferrite according to the present invention has a life of more than 4 times the life of conventional magnetic heads.

Example 3

A main component composed of 52.0 mol percent of $Fe_2O_3$, 28.0 mol percent of MnO and 20.0 mol percent of ZnO was added with additives in the amounts as shown in the following Table 3, and the resulting mixture was mixed in a wet state for 20 hours in a steel ball mill, calcined at 1,050° C. for 2 hours, crushed in a wet state for 20 hours and dried. After added with 5% by weight of distilled water as a binder, the mass was molded into a predetermined shape under a pressure of 3.5 ton/cm.$^2$ to obtain a green compact. The green compact was fired at 1,250° C. for 4 hours under an atmosphere of a reduced pressure of $10^{-4}$ mm. Hg, further fired at 1,380° C. for 4 hours under a helium atmosphere containing 7.0% by volume of oxygen, and cooled under a nitrogen atmosphere to obtain ferrite No. 10.

As a control, the same main component as described above was added with 2.5% by weight of $In_2O_3$, and the resulting mixture was mixed, calcined, crushed and molded under the same conditions as described above. The resulting green compact was fired at 1,250° C. for 4 hours under an atmosphere of a reduced pressure of $10^{-4}$ mm. Hg, further fired at 1,380° C. for 4 hours under a nitrogen atmosphere containing 7.0% by volume of oxygen, and cooled under a nitrogen atmosphere to obtain control ferrite No. 3. Magnetic heads were prepared from the above obtained two ferrites. Properties of the ferrites and properties of the resulting magnetic heads are shown in Table 3.

TABLE 3

| Ferrite number | Additive (percent by weight) Na₂O | K₂O | Y₂O₃ | CeO₂ | In₂O₃ | Time until reproducing output is decreased by 10% of the initial value (hr.) | Ferrite noise | Initial permeability | Magnetic flux density (gauss) | Curie temperature (° C.) | Porosity (percent) |
|---|---|---|---|---|---|---|---|---|---|---|---|
| Present invention, 10 | 0.005 | +0.005 | +0.005 | +0.02 | +2.5 | Longer than 1,000 | Small | 11,700 | 4,250 | 120 | Less than 0.1 |
| Control, 3 | | | | | 2.5 | 310 | do | 10,300 | 4,250 | 120 | 0.6. |

Microscopic observation of the magnetic heads after running test showed that although both of the ferrite No. 10 of the present invention and the control ferrite No. 3 were composed of crystallites of 20–40μ, in the magnetic head prepared from control ferrite No. 3, ferrite crystallites were dropped out, the gap was broken and the reproducing output lowered, while in the magnetic head prepared from ferrite No. 10 of the present invention, no ferrite crystallites were dropped out, and the reproducing output did not lower.

As described above, according to the present invention, ferrites having a high initial permeability and composed of crystallites having a uniform size of 20–40μ can be obtained by a co-effect of the additives and the firing conditions, and accordingly generation of ferrite noise in the magnetic head prepared from the ferrite is small, and further since the ferrite has a low porosity and a high bonding strength between the crystallites, dropping out of ferrite crystallites due to rubbing of magnetic tape hardly occurs in the magnetic head. Therefore, when the ferrite is used as a magnetic head, the head has a life of more than 2 to 4 times the life of conventional magnetic heads, and the ferrite of the present invention is considerably useful in industry.

What is claimed is:

1. A method for producing manganese-zinc ferrite which comprises adding 0.001–0.06% by weight of at least one of alkali metal oxides selected from the group consisting of sodium oxide and potassium oxide, 0.005–0.04% by weight of at least one of rare earth metal oxides selected from the group consisting of $Y_2O_3$, $La_2O_3$, $CeO_2$, $Pr_2O_3$, $Nd_2O_3$ and $Sm_2O_3$, and 0.6–3.0% by weight of indium oxide to starting materials of ferrite consisting of 49–55 mol percent of ferric oxide, 35–15 mol percent of manganese oxide and 30–10 mol percent of zinc oxide, molding the resulting mixture, firing the molded body at a temperature of 1,100–1,300° C. under an atmosphere of a reduced pressure of lower than $10^{-2}$ mm. Hg, again firing the thus treated molded body at a temperature of 1,250–1500° C. under a helium atmosphere containing 0.5–20% by volume of oxygen and cooling the sintered body under a nitrogen atmosphere.

2. A method as claimed in claim 1, wherein said rare earth metal oxide is at least one of the oxides selected from the group consisting of $Y_2O_3$, $La_2O_3$ and $CeO_2$.

3. A method as claimed in claim 1, wherein the starting materials of ferrite are 50–53 mol percent of ferric oxide, 30–20 mol percent of manganese oxide and 27–17 mol percent of zinc oxide.

References Cited

UNITED STATES PATENTS

| | | | |
|---|---|---|---|
| 2,924,573 | 2/1960 | Sasaki et al. | 252—62.62 |
| 3,526,599 | 9/1970 | Akashi et al. | 252—62.62 X |

FOREIGN PATENTS

| | | |
|---|---|---|
| 1,071,611 | 6/1967 | Great Britain. |

OTHER REFERENCES

Shichijo et al. "Journal of Applied Physics," vol. 35, pp. 1646–7, 1964.

JACK COOPER, Primary Examiner

U.S. Cl. X.R.

252—62.58, 62.6, 62.62